Aug. 2, 1949.  C. A. GETZ  2,477,738
METHODS OF DEHYDRATING LIQUID CARBON DIOXIDE
Filed Jan. 28, 1944
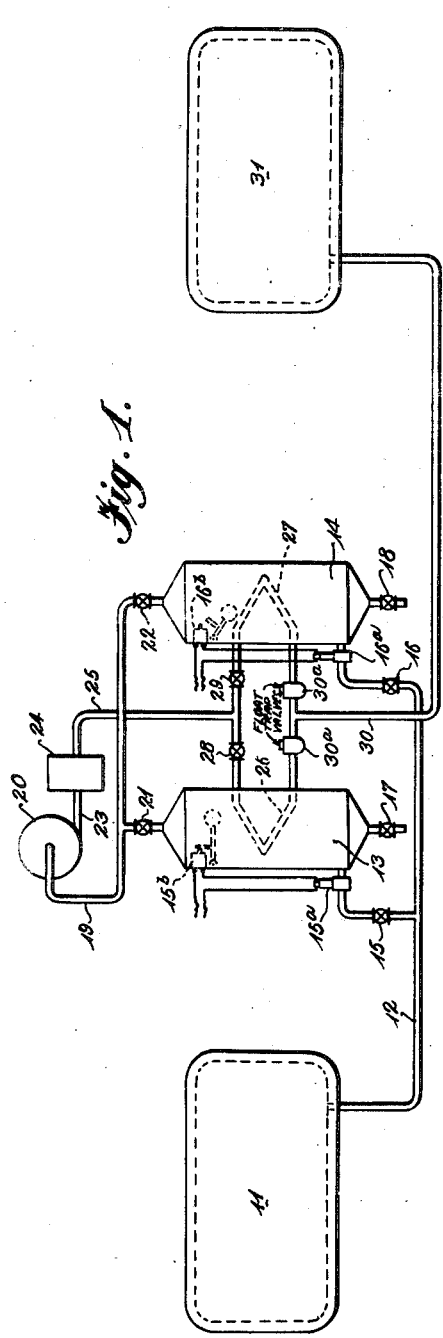
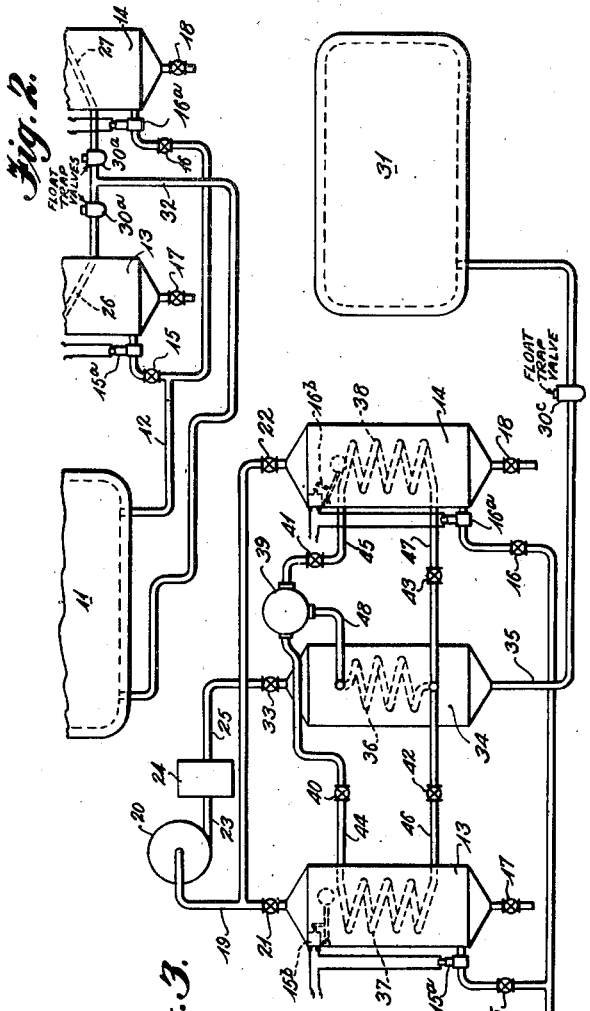
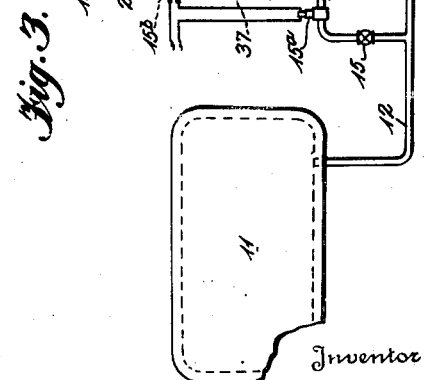
Inventor
Charles A. Getz
Attorney Patented Aug. 2, 1949

2,477,738

UNITED STATES PATENT OFFICE 2,477,738

METHODS OF DEHYDRATING LIQUID CARBON DIOXIDE

Charles A. Getz, Glen Ellyn, Ill., assignor, by mesne assignments, to Cardox Corporation, Chicago, Ill., a corporation of Illinois Application January 28, 1944, Serial No. 520,096

13 Claims. (Cl. 62—1)

This invention relates to new and useful improvements in methods for dehydrating low temperature and low pressure liquid carbon dioxide.

During the last few years the use of liquid carbon dioxide for certain purposes and operations has been increasing at a rapid rate because of the commercial development of methods and apparatus for handling, storing, and using liquid carbon dioxide at pre-selected low temperatures, and their corresponding low vapor pressures. The temperature most frequently selected at this time for commercial operations is 0° F., which provides a vapor pressure of 305.5 pounds per square inch (absolute). However, temperatures ranging as low as —40° F. are at times employed for certain operations.

Probably the greatest expansion in the use of this low temperature, low pressure liquid carbon dioxide, has occurred in the field of fire extinguishment where the improved method of storing in large quantities, at controlled temperatures and pressures, and discharging at high rates has greatly enhanced the extinguishing characteristics of and has materially increased the kinds of hazards which can be protected by this medium.

New, or greatly expanded, uses of any material or substance invariably creates new handling and/or treatment problems and this increase in the use of liquid carbon dioxide is no exception. The present invention is directed to the problem of dehydrating low temperature, low pressure, liquid carbon dioxide to such a state of dryness that water will not be released in pipe lines, flow controlling valves, or the like, as a result of the flashing to vapor of a sufficient percentage of the low temperature liquid carbon dioxide to provide the pressure differential that is essential to effect its flow through pipe lines, etc., under its own vapor pressure. It will be appreciated that even if only a very small quantity of water were to be released into pipe lines and flow control valves of a fire extinguishing system, employing this low temperature, low pressure liquid carbon dioxide as the extinguishing medium, each time the system were used, the water that would accumulate from several operations would be such that proper functioning of valves having small dimensional clearances between their moving parts would be prevented by the freezing of the water.

It is believed that a discussion at this point of some of the physical properties of carbon dioxide will be helpful in arriving at a better understanding of the importance of the problem involved and the manner in which it is solved by the present invention.

Liquid carbon dioxide is a volatile liquid. This means that when liquid carbon dioxide is in equilibrium with vaporous carbon dioxide the pressure and temperature are inter-dependent. If the temperature of the liquid varies, the pressure exerted also varies. Carbon dioxide exists in liquid form only in the temperature range of from —69.9° F. to +87.8° F. This temperature range corresponds to a pressure range of approximately 60.4 pounds per square inch, gage pressure, to 1051.5 pounds per square inch, gage pressure. At the lower limit of this range, we arrive at what is called the "triple point." Below this temperature and pressure range, liquid carbon dioxide does not exist; only carbon dioxide vapor and/or snow can be present. Above +87.8° F. liquid carbon dioxide does not exist. This upper temperature limit is known as the "critical temperature."

An understanding of what takes place when low pressure, low temperature liquid carbon dioxide is discharged through a pipe line is important. Obviously the only reason liquid carbon dioxide flows through a pipe line is because of a pressure differential between any two given points along the length of said line. In order for a pressure of say 80 pounds per square inch to exist at a point of discharge, it is necessary that the liquid which is present at the discharge be refrigerated to the corresponding temperature of —60° F. If the temperature of the stored liquid is 0° F., it should be apparent that considerable heat must be removed from the liquid before it reaches the point of discharge. The liquid carbon dioxide is lowered in temperature by evaporation. Part of the liquid carbon dioxide flashes to vapor and the latent heat of vaporization cools the remaining liquid down to —60° F.

As the liquid carbon dioxide stored at 0° F., and 305.5 pounds pressure (absolute) is discharged from a pipe line, part of the liquid evaporates to cool the remaining liquid to a lower temperature. When the pressure near the discharge point approaches the value of 80 pounds per square inch (absolute) over 20 percent of the liquid carbon dioxide must have changed to vapor.

Each pound of liquid carbon dioxide in storage fills a volume of about .015 cubic foot. As soon as the liquid carbon dioxide begins to flow through a pipe line, part of the liquid flashes to vapor and the total volume per pound of carbon dioxide increases materially. The volume of one pound of carbon dioxide as it approaches the point of discharge is about twelve times the volume of the pound of carbon dioxide as it leaves its storage. This, of course, means that for any given rate of flow the velocity of the medium is much greater near the point of discharge than near the point of storage. That is to say, the pressure drop for any given length of pipe is greater near the discharge than near the storage.

The solubility of water in liquid carbon dioxide is given as .05 percent by weight in Quinn and Jones book entitled "Carbon Dioxide," published as the American Chemical Society's "Monogram Series No. 72." The range covered for this solubility is given in this book as from 20° F. to 70° F. The solubility of water in liquid carbon dioxide has been studied in connection with this invention by means of a special fifty pound capacity liquid carbon dioxide storage tank having transparent plastic ends making it possible to observe the liquid carbon dioxide inside of the tank over a temperature range of from 88° F. on down to the "triple point." Wet carbon dioxide was condensed in the tank and it was observed that a layer of water formed below the layer of liquid carbon dioxide at 2° F. The density of liquid carbon dioxide at this temperature is 63.3 pounds per cubic foot. The maximum density of water is known to be 62.5 pounds per cubic foot. Consequently, one would expect that the liquid water present in the tank would float on top of the liquid carbon dioxide. As pointed out above, this was not the case under the conditions that the experimental tank was operated. Furthermore, it is rather surprising that liquid water exists at this low temperature of 2° F. It is apparent that the water is in a strange form.

The solubility of water in liquid carbon dioxide was also studied using this experimental tank. Water in excess of the solubility was added to a quantity of liquid carbon dioxide in the tank at near the "critical temperature." The tank was agitated vigorously and the water allowed to settle to the bottom of the liquid carbon dioxide. A sample of liquid carbon dioxide was then decanted into a sample cylinder. This quantity of liquid carbon dioxide was evaporated and the vapor passed over a very efficient drying agent. The increase in weight of the drying agent gives the quantity of water present. The volume of the vapor was measured, which through the density tables gives us the weight of the sample taken. This procedure of sampling for the determination of water was continued as the temperature of the liquid carbon dioxide was lowered. Eventually, a pressure of 60.4 pounds per square inch (gage) was reached in the tank. This corresponds to the "triple point." The solubility of the water in the liquid carbon dioxide was found to vary from around 1.00 percent by weight at 70° F. to around .01 at −42° F.

With the above information on the solubility of water in liquid carbon dioxide in mind, let us assume that 100 pounds of liquid carbon dioxide is discharged through a pipe line and that the storage pressure of the liquid is 300 pounds per square inch (gage) while the pressure at the discharge orifice is 100 pounds per square inch (gage). If this liquid carbon dioxide is saturated with water at the storage pressure it will contain at least .033 of a pound of water. As the 100 pounds of carbon dioxide flow through the pipe line, approximately 18 pounds of the liquid carbon dioxide will flash to vapor. This means that 82 pounds of the original 100 pounds remains as liquid carbon dioxide. The 18 pounds of vapor cannot hold more than 0.00005 of a pound of water while the 82 pounds of liquid carbon dioxide cannot hold in solution more than 0.00656 of a pound of water. Consequently, the amount of water that is precipitated is equal to the original quantity (at least 0.033 of a pound), minus the water remaining in the vapor (0.00005 of a pound), minus the water held in solution in the liquid carbon dioxide (0.00656 of a pound), or 0.026 of a pound. As the temperature is below 0° F. throughout the length of the pipe line, the precipitated water has a great tendency to freeze to the pipe walls, and particularly to the intricate moving parts of flow controlling valves.

From the above it should be apparent that if low pressure liquid carbon dioxide is saturated with water, there is grave danger that the moving parts of control valves will fail to function. In actual practice, this has been found to be the case.

It is the primary object of this invention to provide methods for removing water from low temperature, low pressure liquid carbon dioxide to an extent sufficient to avoid deposition of the water when the liquid is caused to flow under its own vapor pressure through pipe lines, and the like.

A more specific object of the invention is to provide methods for dehydrating low temperature and pressure liquid carbon dioxide in connection with its storage in insulated and refrigerated tanks, or in connection with its transfer from one such tank to another.

Other objects and advantages of the invention will be apparent in the following description.

In the accompanying drawings which form a part of this specification and in which like numerals designate like parts throughout the same, Figure 1 is a diagrammatic view illustrating the invention in a form wherein the dehydrated liquid carbon dioxide is kept separate from the untreated carbon dioxide.

Figure 2 is a partial diagrammatic view showing the invention in a form wherein the dehydrated liquid carbon dioxide is mixed with the untreated carbon dioxide, and Figure 3 is a diagrammatic view illustrating the invention in another modified form wherein a fluid heat transfer medium is employed to transfer heat from condensing dehydrated carbon dioxide to evaporating carbon dioxide.

In the drawings, wherein for the purpose of illustration are shown preferred forms of the invention, and first particularly referring to Fig. 1, the reference character 11 designates an insulated storage tank containing wet liquid carbon dioxide from which water is to be removed. The liquid carbon dioxide is maintained at a desired low temperature, say 0° F., and its corresponding vapor pressure by a suitable coil, not shown, in accordance with the teachings of the Geertz and Taylor patent, No. 2,180,231, issued November 14, 1939. A pipe line 12 connects tank 11 to evaporating chambers 13 and 14, which are arranged in parallel with respect to the pipe line, and flow from tank 11 to the two chambers is manually controlled by shut-off valves 15 and 16 in the pipe line and is automatically controlled by solenoid valves 15a and 16a, the electric circuits of which are opened and closed by the float operated switches 15b and 16b. Extending from the bottoms of the chambers 13 and 14 for purging them are drain pipes provided with control valves 17 and 18 respectively. A pipe line 19 leads from chambers 13 and 14 to compressor 20, communication from the two chambers being controlled by valves 21 and 22 in pipe line 19. Pipe 23 extends from the compressor to drying chamber 24 which may contain a drying agent, such as magnesium perchlorate or silica gel. From chamber 24 pipe line 25 leads to condensing coils 26 and 27 within chambers 13 and 14, respectively, communication to these coils being controlled by valves 28 and 29, respectively. Pipe line 30 provides communication from coils 26 and 27 to an insulated tank 31 in which the dehydrated liquid carbon dioxide is stored at the same controlled temperature as in tank 11 by means of a cooling coil not shown. Float trap valves 30a are connected in the outlets of condensing coils 26 and 27.

In the operation of this preferred form of the invention, wet liquid carbon dioxide is admitted from tank 11, where it may be kept at about 0° F. and 305.5 pounds per square inch absolute pressure, to one of the evaporating chambers 13 and 14 by way of pipe line 12 and the opened corresponding shut-off valve 15 or 16. Solenoid valves 15a and 16a are open and deenergized when the liquid levels in chambers 13 and 14 are below the maximum level desired and their float operated switches 15b and 16b are open. The purpose of the two parallel chambers 13 and 14 is to permit use of one for evaporating carbon dioxide, while the other is being thawed out so as to melt and purge out, through valve 17 or 18 as the case may be, the ice accumulated during its previous use. In chamber 13 or 14, the liquid carbon dioxide from tank 11 evaporates and absorbs heat from corresponding coil 26 or 27. In evaporating, the carbon dioxide loses most of its water because saturated carbon dioxide vapor can contain only a very small part of the water that saturated liquid carbon dioxide holds. Thus at 0° F. and 305.5 pounds per square inch absolute pressure carbon dioxide vapor can contain at most 0.00197 percent water vapor while liquid carbon dioxide can dissolve about 0.05 percent water. Consequently all water over about 0.00197 percent separates out during the evaporation of the liquid carbon dioxide taken from tank 11. Incidentally, substantially all oil which in practice may be present in the liquid carbon dioxide is also removed. The water which separates out in the evaporating chamber 13 or 14 deposits in the form of ice while the carbon dioxide vapor is drawn off through pipe line 19 by compressor 20, from which it is forced, under an increase in temperature of about 10° F. and in pressure of about 50 pounds, through chamber 24 where more water may be removed from the vapor by means of a drying agent if it is desired to further dehydrate the carbon dioxide. From chamber 24 the carbon dioxide vapor proceeds to the condensing coil 26 or 27, corresponding to the evaporating chamber in use at the time, by way of pipe line 25 and the corresponding control valve 28 or 29. Heat is absorbed from the condensing coil by the evaporating carbon dioxide in the corresponding evaporating chamber with the result that carbon dioxide condenses in the coil. From the condensing coil the condensed dehydrated carbon dioxide flows through pipe line 30 to storage tank 31 where it is maintained at approximately 0° F. The associated float trap valve 30a prevents carbon dioxide vapor from flow to the storage tank 31.

After a period of use for evaporating wet carbon dioxide from tank 11, each evaporating chamber 13 or 14 requires purging because of the ice which has accumulated therein as a result of the continued evaporation of carbon dioxide and separation therefrom of water, which at the prevailing low temperature deposits in the form of ice. If for example chamber 14 is being purged, valves 16, 22 and 29 are closed and valves 15, 21 and 28 are opened, whereby flow of carbon dioxide through chamber 14 and coil 27 is stopped while flow through chamber 13 and coil 26 is established. After the ice in chamber 14 thaws, valve 17 is opened and purging therethrough is effected of the water and whatever oil separated from the carbon dioxide during evaporation in chamber 14.

The form of the invention shown in Fig. 2 differs from that shown in Fig. 1 in that from the condensing coil the condensed dehydrated carbon dioxide is carried back to the insulated tank 11, by way of pipe line 32, to be commingled and recycled with the liquid carbon dioxide already therein. Hence the liquid carbon dioxide stored for use does not have the high degree of dehydration of that obtained by practicing the form of the invention illustrated in Fig. 1, since the dehydrated product on being returned to storage tank 11 is contaminated with the wet carbon dioxide therein. Yet, after the liquid has been cycled several times, a fairly dry liquid carbon dioxide is obtained which is sufficiently dry for most purposes in connection with which the use of wet or bulk liquid carbon dioxide has not been satisfactory. Thereafter, because part of the product is consumed and replenished with wet liquid carbon dioxide, the liquid stored in tank 11 is maintained in a fairly dry condition without reaching the highly dehydrated condition of the product stored in tank 31 of Fig. 1, although eventually a similar high degree of dehydration would be attained if there should be no occasion to add wet carbon dioxide to tank 11. This form of the invention is advantageous, when a very dry form of liquid carbon dioxide is not required, because of the lower initial cost resulting from the need of only one storage tank.

As illustrated in Fig. 3, the invention may make use of a fluid medium for transferring heat between the carbon dioxide which is condensing and that which is evaporating. In this form of the invention, the arrangement and construction of parts are the same as in Fig. 1 from tank 11 to the drying chamber 24. Pipe 25, however, is provided with a control valve 33 and extends from chamber 24 to a condensing chamber 34 where the carbon dioxide vapor condenses, the condensate flowing from chamber 34 through pipe 35 and the vapor trapping valve 30c to the insulated tank 31. In chamber 34 is a coil 36 for absorbing heat from the condensing carbon dioxide. This coil is part of a heat transfer system which includes a heat transfer coil 37 in chamber 13 and another heat transfer coil 38 in chamber 14, pipe lines connecting the three coils, pump 39, and valves for controlling flow of a fluid heat transfer medium through the various coils. A suitable medium is brine.

In operation, heat transfer coil 37 will be placed in fluid communication with coil 36 when evaporating chamber 13 is in use and likewise heat transfer coil 38 will be made effective to transfer heat into evaporating chamber 14 when it is in use. Thus when carbon dioxide is passed through chamber 13 by opening valves 15 and 21 and closing valves 16 and 22, valves 40 and 42 in pipes 44 and 46 are opened to enable pump 39 to draw brine through pipe 48 from coil 36, where it has absorbed heat from the carbon dioxide condensing in chamber 34, and to force it through pipe 44 into heat transfer coil 37, where the brine gives up heat to the carbon dioxide vaporizing in chamber 13, and back to coil 36 by way of pipe 46. During this part of the operation, valves 41 and 43 in pipes 45 and 47 are closed to prevent flow of brine through coil 38, although it is obvious that warm brine may be passed through coil 38 to facilitate the purging of chamber 14 by quickening the thawing of ice accumulated therein during previous use of this chamber for evaporating carbon dioxide.

From the teachings of the aforesaid patent to Geertz and Taylor, it will be apparent that each of tanks 11 and 31 of Figs. 1, 2 and 3 may be a fixed storage tank or the tank of a transport vehicle. That is to say, the dehydrating of the low temperature and pressure liquid carbon dioxide may be accomplished while transferring the liquid from one fixed storage tank to another fixed storage tank; from a fixed storage tank to a transport tank; from a transport tank to a fixed storage tank; or from one transport tank to another transport tank with the apparatus of Figs. 1 and 3. The apparatus of Fig. 2 may be considered as functioning to dehydrate the carbon dioxide while it is being stored in either a fixed storage tank or in a transport tank.

It is to be understood that I do not desire to be limited to the exact order of steps as they have been disclosed, for variations and modifications of the same, which fall within the scope of the accompanying claims, are contemplated. It further is to be understood that the particular types of apparatus herein shown and described are to be taken only as preferred examples of the invention, and that various changes in the shape, size, and arrangement of parts may be resorted to without departing from the spirit of the invention or the scope of the subjoined claims.

Having thus described the invention, I claim:

1. A method of dehydrating wet carbon dioxide, comprising bringing liquid carbon dioxide into close heat exchange relation with a fluid heat transfer medium having a higher temperature than the liquid carbon dioxide, thereby causing the carbon dioxide to absorb heat from said medium and to evaporate, withdrawing the resulting carbon dioxide vapor, compressing said vapor to increase its pressure, conducting said vapor into close heat exchange relation with said medium under such conditions as to cause heat given off by said vapor to be absorbed by said medium, whereby said vapor is condensed, and circulating said medium between its heat exchange relation with the starting liquid carbon dioxide and its heat exchange relation with the compressed carbon dioxide vapor, whereby heat is transferred from the condensing carbon dioxide to the evaporating carbon dioxide.

2. A method of dehydrating wet carbon dioxide, consisting of evaporating liquid carbon dioxide to release water therefrom, separating the resulting carbon dioxide vapor from the water that is released as a result of evaporating the liquid carbon dioxide, and reliquefying said separated vapor, said reliquefying including passing the vapor in indirect heat exchange relation with the evaporating liquid carbon dioxide, whereby the heat required for evaporating the liquid carbon dioxide is indirectly absorbed from the carbon dioxide vapor to reliquefy the latter.

3. A method of dehydrating wet carbon dioxide, consisting of evaporating liquid carbon dioxide to release water therefrom, separating the resulting carbon dioxide vapor from the water that is released as a result of evaporating the liquid carbon dioxide, passing said separated vapor through a drying agent to remove water vapor from the carbon dioxide vapor, and reliquefying said carbon dioxide vapor, said reliquefying including passing the vapor in indirect heat exchange relation with the evaporating liquid carbon dioxide, whereby transfer of heat from the carbon dioxide vapor to the liquid carbon dioxide is effected through the indirect heat exchange to provide sufficient heat to evaporate the liquid carbon dioxide and to remove sufficient heat to reliquefy the carbon dioxide vapor.

4. A method of dehydrating wet carbon dioxide, consisting of evaporating liquid carbon dioxide to release water therefrom, separating the resulting carbon dioxide vapor from the water that is released as a result of evaporating the liquid carbon dioxide, compressing said vapor to increase its pressure, and condensing said vapor by conducting it in indirect heat exchange relation with the evaporating liquid carbon dioxide, whereby transfer of heat from the carbon dioxide vapor to the liquid carbon dioxide is effected through the indirect heat exchange to provide sufficient heat to evaporate the liquid carbon dioxide and to remove sufficient heat to condense the carbon dioxide vapor.

5. A method of dehydrating wet carbon dioxide, consisting of evaporating liquid carbon dioxide at approximately 0° F. and 305.5 pounds per square inch absolute pressure to release water therefrom, separating the resulting carbon dioxide vapor from the water that is released as a result of evaporating the liquid carbon dioxide, compressing said separated vapor sufficiently to increase its pressure about 50 pounds per square inch, and condensing said vapor by conducting it in indirect heat exchange relation with the evaporating liquid carbon dioxide, whereby transfer of heat from the carbon dioxide vapor to the liquid carbon dioxide is effected through the indirect heat exchange to provide sufficient heat to evaporate the liquid carbon dioxide and to remove sufficient heat to condense the carbon dioxide vapor.

6. A method of dehydrating liquid carbon dioxide stored in a tank, comprising continuously withdrawing liquid carbon dioxide from the tank, evaporating the withdrawn liquid carbon dioxide to release water therefrom, separating the resulting carbon dioxide vapor from the water that is released as a result of evaporating the liquid carbon dioxide, compressing said separated vapor to increase its pressure, condensing said vapor, and returning the condensed carbon dioxide to the tank.

7. A method of removing water from wet liquid carbon dioxide, consisting of applying to the latter the heat required to produce saturated carbon dioxide vapor, separating the resultant vapor from the water that is released as a result of evaporating the wet liquid carbon dioxide, raising the temperature and pressure of the separated vapor to create a temperature differential between said vapor and the wet carbon dioxide, flowing the resultant vapor through a drying agent to remove water vapor therefrom, and condensing the carbon dioxide vapor by extracting therefrom the latent heat and the heat applied in creating said temperature differential, the heat extracted in condensing the dried carbon dioxide vapor being utilized in the supplying of the aforesaid required heat.

8. A method of removing water from wet liquid carbon dioxide, consisting of applying to the latter the heat required to produce saturated carbon dioxide vapor, separating the resultant vapor from the water that is released as a result of evaporating the wet liquid carbon dioxide, compressing the separated vapor to create a temperature differential between said vapor and the wet carbon dioxide, flowing the resultant vapor through a drying agent to remove water vapor therefrom, and condensing the carbon dioxide vapor by extracting therefrom the latent heat and the heat of compression applied in creating said temperature differential, the heat extracted in condensing the dried carbon dioxide vapor being utilized in the supplying of the aforesaid required heat.

9. A method of removing water from wet liquid carbon dioxide, consisting of applying to the latter the heat required to produce saturated carbon dioxide vapor, separating the resultant vapor from the water that is released as a result of evaporating the wet liquid carbon dioxide, raising the temperature and pressure of the separated vapor to create a temperature differential between said vapor and the wet carbon dioxide, flowing the resultant vapor through a drying agent to remove water vapor therefrom, and condensing the carbon dioxide vapor by extracting therefrom the latent heat and the heat applied in creating said temperature differential, the heat extracted in condensing the dried carbon dioxide vapor being utilized in the supplying of the aforesaid required heat by passing the wet liquid carbon dioxide and the dried carbon dioxide vapor in heat exchange relation to each other.

10. A method of removing water from wet liquid carbon dioxide, consisting of applying to the latter the heat required to produce saturated carbon dioxide vapor, separating the resultant vapor from the water that is released as a result of evaporating the wet liquid carbon dioxide, compressing the separated vapor to create a temperature differential between said vapor and the wet carbon dioxide, flowing the resultant vapor through a drying agent to remove water vapor therefrom, and condensing the carbon dioxide vapor by extracting therefrom the latent heat and the heat of compression applied in creating said temperature differential, the heat extracted in condensing the dried carbon dioxide vapor being utilized in the supplying of the aforesaid required heat by passing the wet liquid carbon dioxide and the dried carbon dioxide vapor in heat exchange relation to each other.

11. A method of lowering the water content of wet liquid carbon dioxide, consisting of applying to the latter the heat required to produce saturated carbon dioxide vapor, separating the resultant vapor from the water that is released as a result of evaporating the wet liquid carbon dioxide, raising the temperature and pressure of the separated vapor to create a temperature differential between said vapor and the wet carbon dioxide, and condensing the carbon dioxide vapor by extracting therefrom the latent heat and the heat applied in creating said temperature differential, the heat extracted in condensing the dried carbon dioxide vapor being utilized in the supplying of the aforesaid required heat.

12. A method of lowering the water content of wet liquid carbon dioxide, consisting of applying to the latter the heat required to produce saturated carbon dioxide vapor, separating the resultant vapor from the water that is released as a result of evaporating the wet liquid carbon dioxide, compressing the separated vapor to create a temperature differential between said vapor and the wet carbon dioxide, and condensing the carbon dioxide vapor by extracting therefrom the latent heat and the heat of compression applied in creating said temperature differential, the heat extracted in condensing the dried carbon dioxide vapor being utilized in the supplying of the aforesaid required heat.

13. A method of lowering the water content of wet liquid carbon dioxide, consisting of applying to the latter the heat required to produce saturated carbon dioxide vapor, separating the resultant vapor from the water that is released as a result of evaporating the wet liquid carbon dioxide, raising the temperature and pressure of the separated vapor to create a temperature differential between said vapor and the wet carbon dioxide, and condensing the carbon dioxide vapor by extracting therefrom the latent heat and the heat applied in creating said temperature differential, the heat extracted in condensing the dried carbon dioxide vapor being utilized in the supplying of the aforesaid required heat by passing the wet liquid carbon dioxide and the dried carbon dioxide vapor in heat exchange relation to each other.

CHARLES A. GETZ.

REFERENCES CITED

The following references are of record in the file of this patent:

UNITED STATES PATENTS

| Number | Name | Date |
| --- | --- | --- |
| 2,089,558 | Karwat | Aug. 10, 1937 |
| 2,093,805 | De Baufre | Sept. 21, 1937 |
| 2,325,045 | Dennis | July 27, 1943 |
| 2,341,697 | Dennis | Feb. 15, 1944 |